(12) United States Patent
Stek et al.

(10) Patent No.: US 8,644,118 B2
(45) Date of Patent: *Feb. 4, 2014

(54) INFORMATION CARRIER COMPRISING ACCESS INFORMATION

(71) Applicant: Koninklijke Philips Electronics N.V., Eindhoven (NL)

(72) Inventors: Aalbert Stek, Eindhoven (NL); Martinus W. Blum, Eindhoven (NL); Bart Van Rompaey, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,642

(22) Filed: Dec. 7, 2012

(65) Prior Publication Data

US 2013/0100784 A1    Apr. 25, 2013

Related U.S. Application Data

(63) Continuation of application No. 13/352,370, filed on Jan. 18, 2012, now Pat. No. 8,351,313, which is a continuation of application No. 13/004,126, filed on Jan. 11, 2011, now Pat. No. 8,320,224, which is a continuation of application No. 10/545,637, filed as application No. PCT/IB2004/050087 on Feb. 9, 2004, now Pat. No. 7,889,612.

(30) Foreign Application Priority Data

Feb. 20, 2003   (NL) ...................................... 1022744

(51) Int. Cl.
*G11B 21/08*   (2006.01)

(52) U.S. Cl.
USPC ....................................................... 369/30.04

(58) Field of Classification Search
USPC .......... 369/59.25, 59.21, 53.21, 53.24, 53.13, 369/47.22, 47.27, 47.17, 275.3
See application file for complete search history.

(56) References Cited

U.S. PATENT DOCUMENTS

| | | | |
|---|---|---|---|
| 4,972,401 A | 11/1990 | Carasso et al. | |
| 5,809,545 A | 9/1998 | Ozaki et al. | |
| 5,832,088 A | 11/1998 | Ogawa et al. | |
| 5,903,411 A * | 5/1999 | Tomita et al. | 360/78.14 |

(Continued)

FOREIGN PATENT DOCUMENTS

| | | |
|---|---|---|
| EP | 093615 | 7/1999 |
| EP | 0930615 A2 | 7/1999 |

(Continued)

OTHER PUBLICATIONS

K.C. Pohlmann, "Principles of Digital Audio", Fourth Edition, 2000 XP002285403.

(Continued)

*Primary Examiner* — Joseph Feild
*Assistant Examiner* — Parul Gupta

(57) ABSTRACT

An apparatus for accessing an information carrier for holding user information includes access information for accessing the user information, the access information being stored in a pre-determined first region on the information carrier. The information carrier further includes at least one further region different from the first region, the further region comprising dummy information.

30 Claims, 5 Drawing Sheets

(56) References Cited

U.S. PATENT DOCUMENTS

Figure 1:
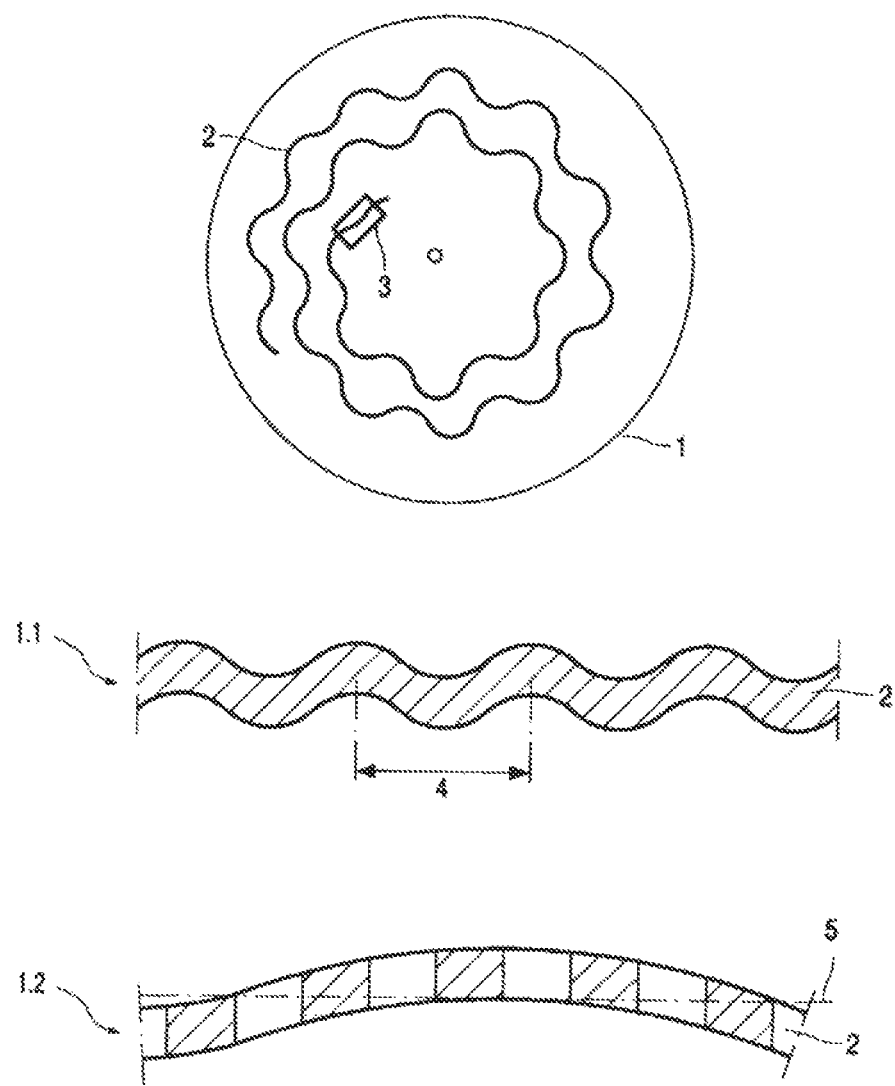

| | | |
|---|---|---|
| 6,654,332 B2 | 11/2003 | Coene et al. |
| 7,010,124 B1 | 3/2006 | Ishiguro et al. |
| 7,215,610 B2 | 5/2007 | Sako et al. |
| 2003/0133386 A1 | 7/2003 | Hahn |
| 2008/0219111 A1* | 9/2008 | Van Rompaey et al. ... 369/44.27 |

FOREIGN PATENT DOCUMENTS

| | | |
|---|---|---|
| EP | 1475788 A1 | 11/2004 |
| EP | 1577885 A2 | 9/2005 |
| JP | 2001209937 A | 8/2001 |
| JP | 2001351321 A | 12/2001 |
| JP | 200203369 A | 7/2002 |
| JP | 2004213781 A | 7/2004 |
| JP | 2004213781 A1 | 7/2004 |
| WO | 0021085 A1 | 4/2000 |
| WO | 0057416 | 9/2000 |
| WO | 0225645 A2 | 3/2002 |
| WO | 03049107 A2 | 6/2003 |

OTHER PUBLICATIONS

Wilson, "Spread-Spectrum Modulation", 1996 Digital Modulation and Coding, p. 247-256, XP008030735.

J. Bergmans, "Digital Baseband Transmission and Recording", Boston, MA, Kluwer Academic Publication, 1996, p. 122-129, XP008030734.

* cited by examiner

INFORMATION CARRIER COMPRISING ACCESS INFORMATION

This application is a continuation of prior U.S. patent application Ser. No. 13/352,370, filed Jan. 18, 2012, now U.S. Pat. No. 8,351,313, issued Jan. 8, 2013, which is a continuation of prior U.S. patent application Ser. No. 13/004,126, filed Jan. 11, 2011, now U.S. Pat. No. 8,320,224, issued Nov. 27, 2012, which is a continuation of prior U.S. patent application Ser. No. 10/545,637, filed Aug. 16, 2005, now U.S. Pat. No. 7,889,612, issued Feb. 15, 2011, which is a National Stage Application of PCT/IB2004/050087 and which claims the benefit of Dutch Patent Application No. 1022744, filed Feb. 20, 2001, the entire contents of each of which are incorporated herein by reference thereto.

The invention relates to an information carrier for holding user information, the information carrier comprising access information for accessing the user information, the access information being stored in a pre-determined first region on the information carrier. The invention further relates to an apparatus for reading out information from the information carrier.

The art of hiding access information on an information carrier for holding user information is laid in the fact that you distract peoples' (the hackers) attention from the access information that you want to hide. Using this access information, the user information on the information carrier can be accessed. For copy protection purposes it is sometimes desired to hide this access information; this access information can for example be hidden in the user information you want to protect or this access information can be hidden in a side channel present on the information carrier. From optical information carriers such as CD or DVD, it is for example known that this access information can be written in a so-called "wobble channel" (sometimes also called "radial error channel").

It is an object of the invention to realize an information carrier comprising access information for which illegal retrieval of the user information is further prevented.

According to the invention, this object is achieved by the information carrier which is characterized in that the information carrier further comprises at least one further region different from the first region, the further region comprising dummy information stored on the information carrier.

The invention is based on an insight that the noise level of the read out signal increases somewhat in the region(s) where the access information is hidden. Malicious people can observe this noise level and determine the region where the access information is located. Using the position of this region can be used in further attempts to illegally retrieve the access information. To avoid this difference in noise level between regions with and without the access information, this access information is assigned for only a specific region of the information carrier, but dummy information is also written in other regions. This information is called dummy information as it comprises no information about the access information. By observing the signals from the information carrier no difference between access or dummy information can be noticed, as only pre-knowledge about the exact position of the access information enables the possibility of retrieving this access information. Due to this, an improved copy protection system against illegal read out of the user information present or to be present on the information carrier is realized.

In an embodiment of the information carrier according the invention, wherein the access information is stored on the information carrier according to a pre-determined format, the information carrier is characterized in that the dummy information is stored on the information carrier according to the same or similar format. With the term "format" is indicated that the way in which the information, in this case the access information and the user information are stored on the information. Every information must be converted according to a certain format in order to make it suitable for recording on an information carrier. The dummy information is stored on the information carrier according to the same or similar format as used for the access information as the change in the noise level of the read out signal for the dummy information will in that case be similar to the change in the noise level of the read out signal for the access information. This has the advantage that determining the exact position of the access information is made more difficult.

In another embodiment of the information carrier according to the invention, the information carrier is characterized in that the pre-determined first region is a region which is accessed by an apparatus for playing and/or recording the information carrier when it initially access the information carrier. It is important for the integrity of the access information that the number of people knowing about the position on the information carrier of the access information must be kept as limited as possible. However, pre-knowledge about the exact position of the access information is necessary to retrieve it. To prevent disclosing this information about the position detection to semiconductor companies that make IC's to be used in an apparatus for playing the information carrier according to the invention, the position of the access information can be supplied to them by a piece of VERILOG code, with a well defined interface, which can be added to their own IC design and takes care of the detection of the access information. In this way semiconductor companies do not need to be informed about the exact position of the access information. It is advantageous not having to inform the drive designing companies to design the drive such that it first has to access this exact position for a certain time and then proceed with the normal procedure again, as this might reveal the position of the access information. In order to be able to keep the position of the access information a secret, the pre-determined first region comprising the access information is a region which is accessed by the apparatus for playing and/or recording the information carrier when it initially access the information carrier. Thus, by taking care that the access information is written in a region where the playback device has to be anyway when it initially accesses the information carrier, the access information can be read without informing the IC or drive manufacturers. This has as a further advantage that the position of the access information does not have to be mentioned in the standard specification describing the information carrier according to the invention. This position information only remains in the VERILOG code. Types of regions that can be used for this are for example: the TOC (table of contents) region, the DI (disc information) region, the MKB (Media Key Block) region or another place where other access or copy control information is stored.

In another embodiment of the information carrier according to the invention, the information carrier is characterized in that the information carrier comprises the user information, the access information being buried in the user information. By burying the access information in the user information, tampering with the access information is discouraged, as amending (part of) the access information can result in unintentional removal or damage of the user information. Several techniques for burying data are known in the art, for example from Principles of Digital Audio, Ken C. Pohlmann, fourth edition, 2000, pages 678-680. In these techniques dithering and noise shaping is applied to a data signal for enabling replacing several least-significant bits with buried data.

In another embodiment of the information carrier according to the invention, the information carrier is characterized in that the access information is stored in a side channel of the information carrier. By stored the access information in a side channel retrieving this information is further hindered. Side channels which can for example be used for this are: a "wobble channel" in which the information is stored in the modulation of the radial position of the pits/marks in a wobbled track, as is used for example in the CD-R and CD-RW discs; a "wobble channel" in which the information is stored in the modulation of the tangential position of the pits/marks in a wobbled track, for example by time base modulation, or pit shift; a side channel which is created by modulating the pit shape, as for example used in so-called Limited Multilevel techniques, as is described in International Patent Application WO 00/57416 A1 (PHN 17.369); this pit shape can be modulated in different ways, for example by modulation of the pit-depth or pit-with, but also by creating pear-shaped pits, or dog-bone shapes bits; a side channel which is created by using special bit-strings. In principle every deviation from a physical parameter which results in a detectable analog signal can be used for creating an analog side channel. The channel modulation can also be used for introducing a digital side channel.

In another embodiment, the information carrier further comprises a Permanent Information & Control data (PIC) zone, the access information being stored in the PIC zone. In this PIC zone, general information about the information carrier and various other information are stored. This so-called PIC information can be stored in pre-recorded pits/lands (or marks/lands), but this information can also be stored in pre-recorded high frequency modulated (HFM) grooves which are modulated in the radial direction with a rather high bandwidth signal. This PIC zone is used in a new optical information carrier, called BluRay disc. In another embodiment, the information carrier is a read-only optical information carrier, like for example a DVD-ROM disc or a BluRay-ROM disc. The access information can for example be stored in a pre-determined region of the PIC zone and the dummy information can be stored in other regions of the PIC zone.

In another embodiment, the position of the pre-determined first region is hidden on the information carrier. This position can for example, in the case of an information carrier comprising a wobbled pre-groove, be hidden in the radial excursion of the wobbled pre-groove.

In another embodiment, the information carrier further comprises a special area comprising position bits indicating the position of the pre-determined first region. The position bits can for example be stored on the information carrier in a variation of a parameter, which variation is detectable by integration detection. For example in the case of an information carrier comprising a PIC zone, a reference to the position of the access information in the PIC zone is stored on the information carrier. In the PIC zone, a main data channel with Address Unit Numbers (AUN) is present. These AUNs are used for indicating the starting position of the access information in the PIC zone. In order to hinder the illegal retrieval of the access information, methods exist to hide the access information into the noise of this channel. For example spread spectrum techniques can be used for this. In these techniques, the hidden access information can be detected by integrating the read out signal in a special way. Spread spectrum techniques are for example known from "Digital Modulation and Coding", Wilson, p. 247-256 and the references therein. Integration detection is for example known from "Digital Baseband Transmission and Recording", Jan W. M. Bergmans, p. 122-129. In spread spectrum techniques the bandwidth of a signal is intentionally made larger using spread spectrum modulation. The modulated signal can be detected using integration detecting methods using for example a hypothetical maximum-likelihood receiver.

The invention further relates to an apparatus for reading out information from the information carrier according to the invention, the apparatus comprises a reading unit for reading out user information and access information from the information carrier, and access control means for providing access to the user information in dependence on the access information.

These and other aspects of the invention are apparent from and will be elucidated with reference to the embodiments described hereinafter.

Figure 2:
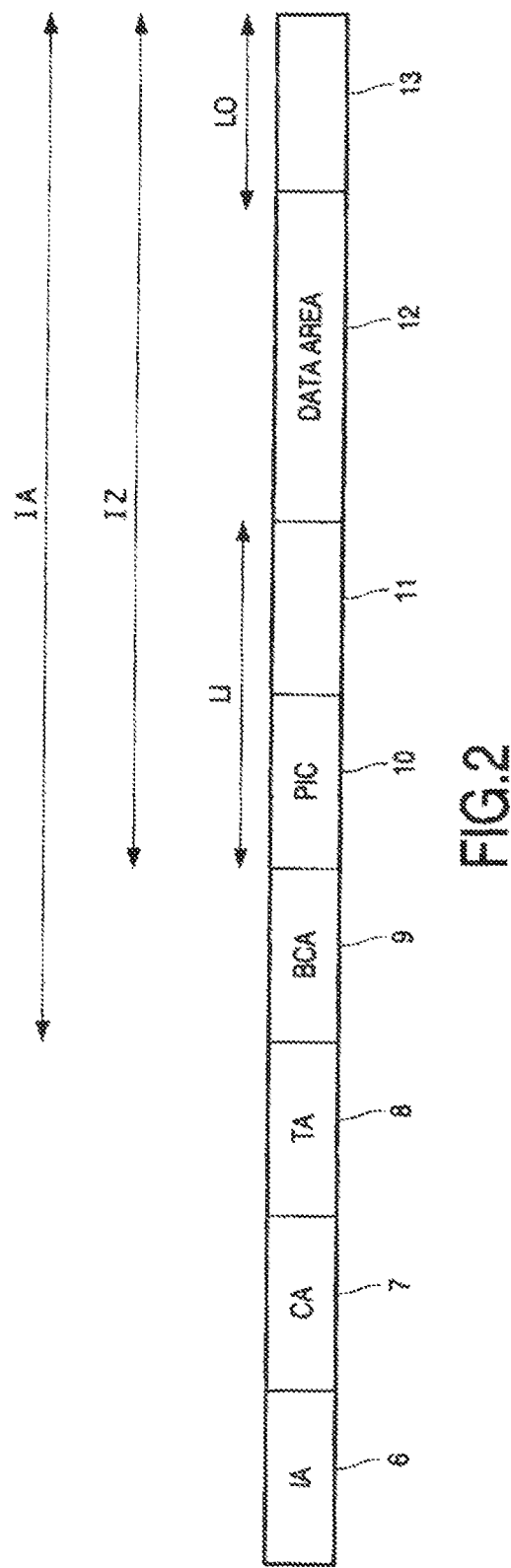
Figure 3:
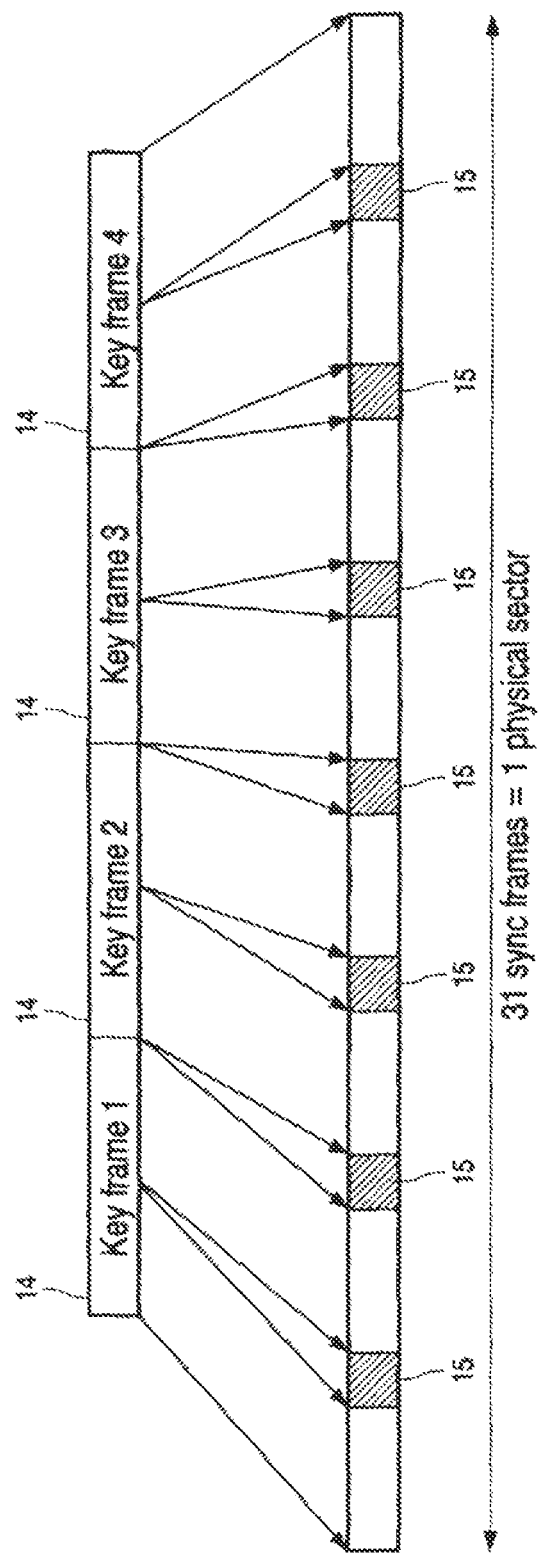
Figure 4:
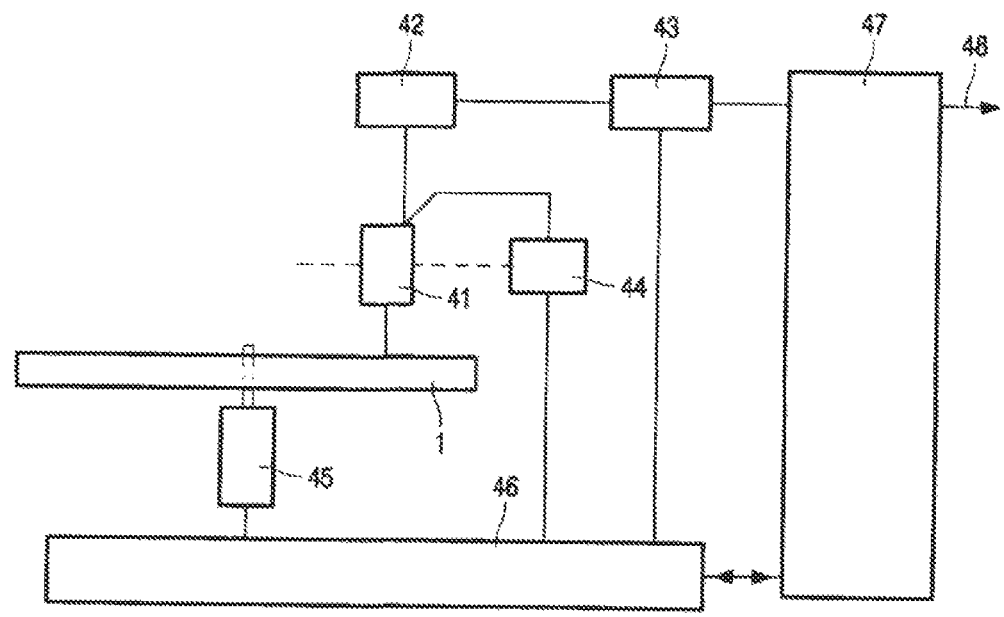
Figure 5:
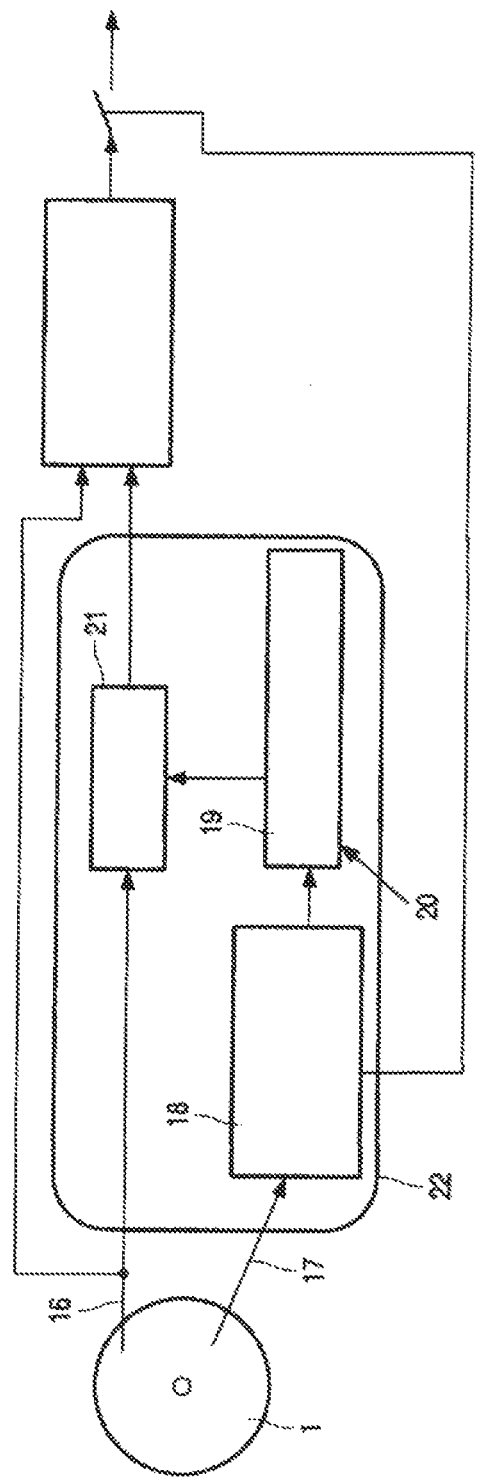

In the Drawings:

FIG. 1 shows a first embodiment of the information carrier according to the invention, FIG. 2 shows a second embodiment of the information carrier according to the invention, in which the access information and the dummy information are stored in the PIC zone, FIG. 3 shows a third embodiment of the information carrier according to the invention, in which the exact location of the access information in the PIC zone is indicated, FIG. 4 shows an embodiment of an apparatus for reading out access information from an information carrier, FIG. 5 shows an embodiment of the use of the access information for giving access to the user information.

In FIG. 1 a first embodiment of the information carrier according to the invention is shown. Information carrier 1 exhibits a track pattern comprising a spiral groove 2 of constant width provided with a radial wobble. These teachings are, among others, used in the well-known standardized CD-R discs. For the sake of clarity the pitch of the spiral and the radial wobble are strongly exaggerated. In general, the pitch of the consecutive turns of the spiral path is generally of the order of magnitude of 1 to 2 μm. In this Figure, two possible embodiments of this information in which the access information is stored in a wobble channel are shown, as an enlargement of box 3. In these implementations the information on the physical parameter is stored in the lead-in of the information carrier. The lead-in of the information carrier is an area on the information carrier situated before the area comprising the user information. Track 1.1 shows the groove in which the access information is stored as a width variation of the track. This variation has a certain length, indicated with the reference number 4. The information can be read out from the record carrier using the tracking signals available in a standard device for reading out record carriers, e.g. a CD or DVD player. Track 1.2 shows a track in which the access information is stored as in the form of a deviation of the track from the average centerline 5. Such a deviating track, which is generally called a wobble, is used in different standardized optical record carriers, like e.g. the CD-R disc and the DVD+RW disc. Additional information can be found in U.S. Pat. No. 4,972,401 (=PHN 9666).

In this embodiment, in the lead-in both a pre-determined region for holding the access information and a further region for holding dummy information are defined. This access information can for example be used for decrypting the user information stored on the information carrier.

Another embodiment is shown in FIG. 2, in which the access information and the dummy information are stored in the PIC zone of the information carrier. In this embodiment, the information carrier comprises a so-called Permanent Information & Control data (PIC) zone. In this PIC zone general information about the information carrier and various other information in stored. In this way, a data channel for pre-recorded information with sufficient capacity and data rate is created. In this embodiment, the PIC information is stored in pre-recorded pits/lands (or marks/lands), but this information can also be stored in pre-recorded high frequency modulated (HFM) grooves which are modulated in the radial direction with a rather high bandwidth signal. Due to the fact that the information is stored in a wobble channel, a buried channel is created. In FIG. 2 the layout of the information carrier comprising the PIC zone is indicated. The area on the information carrier nearest to the carrier center is called the Inner area (IA) 6. Next to this is the Clamping area (CA) 7 which is used by the playing apparatus for clamping the information carrier so that a stable rotation can be accomplished. Next to this is the Transition area (TA) 8. After this area, the Information area (IA) is situated. This Information area comprises the Information Zone (IZ) and the Burst Cutting Area (BCA) 9. The Burst Cutting Area is used to add information to the information carrier after completion of the manufacturing process. The BCA-code can be written by a high-power laser system or by the initializer in case of rewritable discs. The Information Zone (a) comprises the Lead-in Zone (LI), the Data Area 12 and the Lead-out Zone (LO) 13. The Lead-in Zone comprises the PIC zone 10 and the rest of the Lead-in Zone 11.

In this embodiment, the access information is stored in a pre-determined region of the PIC zone; the other regions of the PIC zone comprise the dummy information. This dummy information is written in the same format as the access information.

In order to be able to read out the access information, a reference to the position of the access information in the PIC zone can be retrieved by a certain method. In this embodiment this method is as follows. The PIC zone comprises a main data channel, with Address Unit Numbers (AUN). These AUN are used for indicating the starting position of the access information in the PIC zone. This is possible as the wobble channel signal is locked to the data signal (HF-channel). An address is 4 bytes (without ECC bytes). As the PIC zone is only situated in a small part of the information carrier, only a limited number of the least significant bits (lsb's) of the 32 bits change within the PIC zone (generally only the first 16 lsb's). These 16 bits are sufficient to determine the position within the PIC zone. The PIC zone extends over some 2000 tracks; suppose that the access information is only present in 20 consecutive tracks, the starting position of this access information being determined by an AUN from the user information. The first 16 lsb's of this AUN are than positioned over the complete PIC zone, for example using an unscrambled modulation. Due to that, it becomes possible, when you arrive at a random position in the PIC zone, to read out the first 16 bits of the AUN, to jump to the starting position of the access information, and to read out the access information. In this way, the exact location of the access information is further hidden in the PIC zone, as it is only situated in a certain position in this band, and not throughout the complete band.

Another embodiment of the information carrier according to the invention, in which the exact location of the access information in the PIC zone is indicated is shown in FIG. 3. In this embodiment the information carrier comprises four Key frames 14. In these Key frames, 31 sync frames are present, being numbered from 0 to 30. In sync frames number 3, 7, 11, 15, 19, 23 and 27 (indicated with reference number 15) an 8-bit number is stored which indicates the exact location of the access information. In the case the access information access information is stored on the information carrier in a variation of a parameter, which variation is detectable by integration detection, the exact location of the access information can be changed using this 8 bit number. This 8-bit number can than for example indicate which seed and permutation should be used for detecting the bits making up the access information.

FIG. 4 shows an embodiment of an apparatus for reading out access information from an information carrier. The apparatus comprises a reading unit for reading out user information and access information from the record carrier 1. The read unit comprises a read head 41 for scanning the track and generating a read signal corresponding to the physical marks on the record carrier, and a translating unit 42 for translating the read signal into the bit sequence, e.g. an EFM decoder for decoding in a CD system. The bit sequence is coupled to an error-correcting unit 43 for recovering the information and correcting possible errors, e.g. the CIRC corrector in a CD system. The recovered information is coupled to access control means 47 for controlling the access to the information. The read out access information is available for further processing on the output 48 of the access control means 47. During reading the read head 41 is positioned on the track by a servo unit 44 of the usual type, while the record carrier is rotated by a motor unit 45. The reading of information is controlled via a controller 46, which controller controls the motor unit 45, the servo unit 44 and the error correction unit 43, and is arranged for receiving read commands, e.g. via an interface to the access control means 47.

The reading out of the access information will be effected as follows. The access control means will read out the pre-determined first region comprising the access information, e.g. PIC zone. Using this access information, which can for example be a decryption key for decrypting the encrypted user information, access is given to the user information. In the case the information carrier does not comprise the access information, or the apparatus is not capable of reading out the access information, the information carrier will be rejected and access to the user information will be barred.

FIG. 5 shows an embodiment of the use of the access information for giving access to the user information. It is shown that user information 16 is read out from the information carrier 1, for example using the apparatus as shown in FIG. 4. The access information 17 is detected in a detection module 18. The detection module has knowledge on the exact location of the access information, or the detection module is able to detect this location as it is familiar where position bits indicating the position of the access information are present on the information carrier. These position bits can for example be detected using integration detection. Using this detected access information the decryption key is calculated in module 19. As an extra input for this calculation a random number 20 is used. This number can be a number hidden on the information carrier, but can also be inputted by the user of the apparatus. The calculated key is used in decryption module 21 to decrypt the user information. After decryption of the user information this information is further processed or outputted. This can be made conditional on the detection of the correct access information. Modules 18, 19 and 21 can be supplied to the IC manufacturers in VERILOG code. Due to this, no information on the access information detection or the key calculation have to be disclosed, as this takes places inside the VERILOG block 22.

Although the invention has been elucidated with reference to the embodiments described above, it will be evident that other embodiments may be alternatively used to achieve the same object. The scope of the invention is therefore not limited to the embodiments described above, but can also be applied to all kinds of information carriers, read-only, write-once or rewritable types of carriers. The scope of the invention is further not limited to certain kinds of access information. All information which is or can be used as access information, i.e. information used for giving access to the user information stored or to be stored on the information carrier according to the invention fall within the scope of the invention. The scope of the invention is further not limited to certain buried channel techniques or certain (hidden) side channels. All techniques and channels which can be used for storing information fall within the scope of the invention.

It must further be noted that the term "comprises/comprising" when used in this specification, including the claims, is taken to specify the presence of stated features, integers, steps or components, but does not exclude the presence or addition of one or more other features, integers, steps, components or groups thereof. It must also be noted that the word "a" or "an" preceding an element in a claim does not exclude the presence of a plurality of such elements. Moreover, any reference signs do not limit the scope of the claims; the invention can be implemented by means of both hardware and software, and several "means" may be represented by the same item of hardware. Furthermore, the invention resides in each and every novel feature or combination of features.

The invention can be summarized as follows: the invention relates to an information carrier for holding user information, the information carrier comprising access information for accessing the user information, the access information being stored in a pre-determined first region on the information carrier. The information carrier further comprises at least one further region different from the first region, the further region comprising dummy information. The invention is based on the insight that the noise level of a read out signal increases somewhat in the region(s) where the access information is hidden. To avoid this difference in noise level between regions with and without the access information, this access information is assigned for only a specific region of the information carrier, but dummy information is also written in other regions. Due to this, an improved copy protection system against illegal read out of the user information present or to be present on the information carrier is realized.

The invention claimed is:

1. An apparatus for reading out information from an information carrier, the apparatus comprising:
   a reading unit configured to read out user information and access information from the information carrier; and
   access control unit configured to provide access to the user information in dependence on the access information;
   wherein the access information are stored in a pre-determined first region on the information carrier, and
   wherein dummy information are stored in at least one further region, and
   wherein a change in a noise level of a read out signal for the dummy information is similar to a change of a noise level of a read out signal for the access information.

2. The apparatus of claim 1, wherein apparatus is configured to initially accesses the predetermined first region when reading the information carrier.

3. The apparatus of claim 1, wherein the predetermined first region is the Table of Contents region, the Disc Information region or the Media Key Block region.

4. The apparatus of claim 1, wherein the information carrier further comprises a Permanent Information and Control data (PIC) zone, the access information being stored in the PIC zone.

5. The apparatus of claim 4, wherein the access information is stored in the PIC zone in pre-recorded pits-lands or in pre-recorded high frequency modulated grooves.

6. The apparatus of claim 4, wherein the access information is stored in a pre-determined region of the PIC zone, the dummy information being stored in other regions of the PIC zone.

7. The apparatus of claim 1, wherein the information carrier comprises a read-only optical information carrier.

8. The apparatus of claim 1, wherein a position of the pre-determined first region is hidden on the information carrier.

9. The apparatus of claim 8, wherein the information carrier further comprises a special area comprising position bits indicating the position of the pre-determined first region.

10. The apparatus of claim 1, wherein the access information is stored on the information carrier in a variation of a parameter, the parameter being a radial position of pits-marks in a wobbled track.

11. The apparatus of claim 10, wherein the variation of the parameter is detectable by integration detection.

12. The apparatus of claim 1, further comprising a detection module configured to detect the access information in the pre-determined first region by integration detection.

13. The apparatus of claim 1, further comprising a detection module configured to detect position bits indicating a position of the pre-determined first region.

14. The apparatus of claim 13, wherein the position bits are stored in a special area of the information carrier, the position bits indicating a position of the pre-determined first region.

15. The apparatus of claim 14, wherein the position bits are stored on the information carrier in a variation of a parameter, and wherein the variation is detectable by integration detection.

16. The apparatus of claim 1, further comprising a detection module configured to detect the access information in the pre-determined first region, wherein the access control unit and the detection module are integrated into a VERILOG block.

17. The apparatus of claim 1, wherein the dummy information is stored on the information carrier according to a same or similar format as used for the access information, so that a change in the noise level of a read out signal for the dummy information is similar to a change in the noise level of a read out signal for the access information.

18. The apparatus of claim 1, wherein the access information is stored on the information carrier in a side channel, the side channel being a wobbled pre-groove or a wobbled information track.

19. The apparatus of claim 1, wherein a position of the first region is hidden in a radial excursion of a wobbled pre-groove or a wobbled information track of the information carrier.

20. The apparatus of claim 1, wherein the first region and the second region are in a lead-in area of the information carrier situated before a user region comprising the user information.

21. The apparatus of claim 1, wherein the information carrier further comprises position information related to a position of the access information stored in portions of sync frames included in the information carrier.

22. The apparatus of claim 21, wherein the position information are included in every fourth sync frames of key frames included in the information carrier.

23. The apparatus of claim 1, wherein the access control unit is further configured to calculate a decryption key using the access information, and to decrypt the user information using the decryption key.

24. The apparatus of claim 23, wherein the access control unit is further configured to hide a random number for use in calculating the decryption key.

25. The apparatus of claim 1, wherein the access control unit is further configured to bury the access information in the user information.

26. A non-transitory computer readable media for insertion into a reading apparatus for reading user information from the media; the media comprising:
- a first region comprising access control information and a different further region comprising dummy information, wherein a change in a noise level of a read out signal for the dummy information is similar to a change of a noise level of a read out signal for the access information; and user information,
- wherein the access control information is configured to control a controller of the reading apparatus to provide access to the user information depending on the access information.

27. The media of claim 26, wherein a position of the first region is predetermined by a standard for the media.

28. The media of claim 26, wherein the access information is stored on the information carrier in a side channel, the side channel being a wobbled pre-groove or a wobbled information track.

29. The media of claim 26, wherein the access information is stored on the media as encoded deviations in a lateral position of a wobbled pre-groove or a wobbled information track.

30. The media of claim 26, wherein the dummy information is stored on the information carrier according to a same or similar format as used for the access information, so that the change in the noise level of the read out signal for the dummy information is similar to the change in the noise level of the read out signal for the access information.

* * * * *